INVENTORS
Joe M. Boyd
Philip Grandio, Jr.
James R. Lobb

United States Patent Office 3,438,741
Patented Apr. 15, 1969

3,438,741
APPARATUS FOR FLAME REACTION OF HYDROCARBONS
Joe M. Boyd, La Marque, Philip Grandio, Jr., Texas City, and James R. Lobb, Dickinson, Tex., assignors to Monsanto Company, St. Louis, Mo., a corporation of Delaware
Filed Aug. 25, 1966, Ser. No. 575,133
Int. Cl. B01f 3/02
U.S. Cl. 23—277          8 Claims

ABSTRACT OF THE DISCLOSURE

A cylindrical gas distributor for use in an apparatus for the incomplete combustion of hydrocarbons with oxygen in a flame reaction having a plurality of parallel channels for passing gas from the mixing chamber to the reaction chamber of said apparatus which contain devices for imparting a swirling motion to the gases exiting therefrom, said gas distributor being fabricated of ceramic material combined with metal and designed so as to provide uniform gas distribution to the pilot flames on the face of the gas distributor and thus provide a uniform flame front in the reactor.

---

The present invention relates to an apparatus for the incomplete combustion of hydrocarbons.

Processes are known for the production of hydrocarbons, especially acetylene, by the incomplete combustion of hydrocarbons and oxygen with the formation of a flame by separately preheating the hydrocarbons and the oxygen, mixing them as quickly and completely as possible and leading the gas mixture through a gas distributor provided with a plurality of parallel channels and in which a gas speed is maintained which is greater than the speed of the flame which forms and burns at the gas outlet from the gas distributor in the adjoining free reaction chamber. In order to maintain the flame in the apparatus in many of these processes, it is necessary to maintain pilot flames on the face of the gas distributor adjacent the raction chamber and/or on the side walls of the reaction chamber. The means for distributing gas to the pilots on the face of the gas distributor has usually been a spaghetti-like mass of metal tubes in the interstices of the gas distributor. This type arrangement is not satisfactory as it does not provide uniform gas distribution to the pilots and thus does not provide a uniform flame front in the reaction chamber. This is mainly due to pressure differences in the various metal tubes which supply the gas to the pilots. Further, this type of arrangement is not satisfactory since any tubes leading to the pilots which become plugged cannot be cleaned or replaced without the expenditure of considerable time and expense due to the configuration of these tubes.

It is, therefore, an object of the present invention to provide an improved apparatus for the incomplete combustion of hydrocarbons. It is a further object of the present invention to provide an apparatus for the incomplete combustion of hydrocarbons which can be easily maintained free of plugged pilot tubes. Another object of the present invention is to provide an apparatus for the incomplete combustion of hydrocarbons which will provide a uniform gas distribution to the pilot flames in the reaction chamber. Additional objects will become apparent from the following description of the present invention.

The present invention, in one of its embodiments, comprises an apparatus for the incomplete combustion of hydrocarbons with oxygen in a flame reaction comprising a mixing chamber and a reaction chamber, said mixing chamber having an entrance for the entry of oxygen and hydrocarbons thereto, a gas distributor interconnecting said mixing chamber and said reaction chamber, said gas distributor comprising a block of material having a plurality of parallel channels extending therethrough from said mixing chamber to said reaction chamber, said gas distributor having a hollow inner chamber surrounding substantially all of said parallel channels, said hollow inner chamber having a means for the supply of a combustible gas thereto and being in open communication with said reaction chamber by means of a plurality of straight conduits. By the term "straight" with respect to the conduits is meant that the axis of each conduit is straight. To further define the present invention, reference is made to the accompanying drawings of embodiments of the present invention. The same reference characters are used in each of the drawings to denote like features of the apparatus of the present invention.

Figure 1:
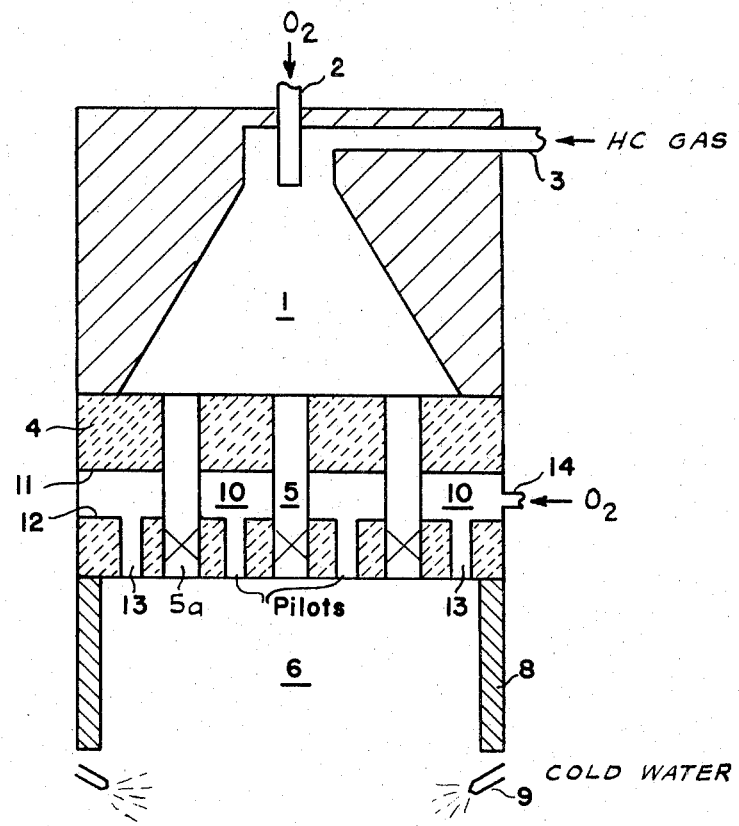
FIGURE 1 is a sectional view of an apparatus for mixing and reacting mixtures of hydrocarbons and oxygen in accordance with the present invention.

Referring now to FIGURE 1, preheated oxygen or oxygen-containing gas enters mixing chamber 1 through line 2 where it meets and is mixed with a stream of preheated gaseous hydrocarbons introduced through line 3. The mixing chamber useful in the present invention may be of various configurations; however, it is preferred that the mixing chamber conically widen from the entrance portion of the mixing chamber to the gas distributor. From mixing chamber 1, the mixed gases pass through a gas distributor 4 by means of parallel channels 5 into reaction chamber 6 where they react in a flame reaction. In each of the channels 5, the gases encounter devices 5a which impart a swirling motion to the gases as they exit into the reaction chamber 6. Reaction chamber 6 is bounded by side walls 8 and by one end of the gas distributor 4. After leaving reaction chamber 6, the gases are cooled by quench nozzles 9 through which a cooling medium, usually water, is introduced into contact with the hot gaseous effluent from reaction chamber 6. Within the gas distributor 4 is a hollow inner chamber 10 having end walls 11 and 12 which is in open communication with reaction chamber by means of straight conduits 13. Oxygen or other suitable gas enters the hollow chamber 10 by means of line 14 and exits through straight conduits 13. The combustion of the gas exiting straight conduits 13 provides the pilot flame required to propagate combustion of the reactants in reaction chamber 6.

While the apparatus has been pictured in FIGURE 1 as having only three parallel channels 5 in the burner block, it is to be understood that in actual operation the apparatus can have varying numbers of channels. Depending on the capacity of the apparatus, a gas distributor useful in the present invention might have from two to 300 parallel channels but will generally have from 120 to 130 parallel channels. These parallel channels may be of various configuration such as round, eliptical, square, or rectangular. The parallel channels may also be Venturi-shaped. Preferably, the parallel channels will be round and have a uniform circular cross-section. Generally, such channels will have a length-to-diameter ratio of from 5:1 to 15:1, preferably about 10:1. The diameter of these channels will usually be from 0.5 to 1.0 inch. Also, the apparatus does not have to be operated in the position pictured in FIGURE 1 so that any reference herein to such terms as "up" or "down" are only relative to the apparatus as shown. In a preferred embodiment, these parallel channels contain devices for imparting a swirling motion to the gases exiting therefrom into the reaction chamber such as those devices disclosed and claimed in copending application Ser. No. 526,680, filed January 28, 1966 and now U.S. Patent 3,399,245 issued on Aug. 27, 1968, the disclosure of which is herein incorporated by reference.

Figure 2:
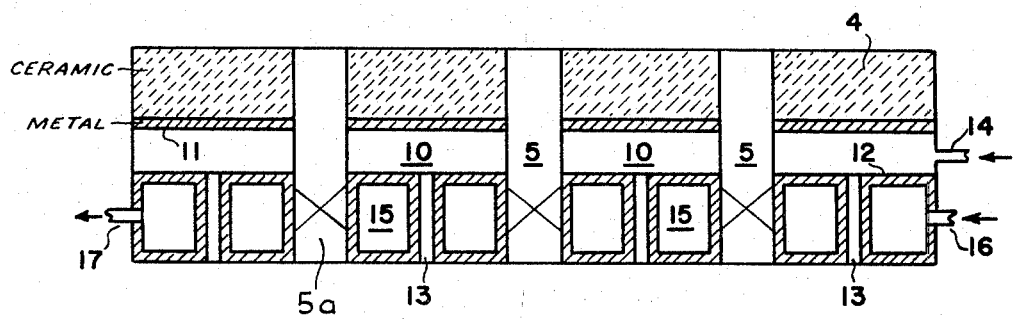
FIGURE 2 is a sectional view of a preferred gas distributor of the present invention.

As can be readily seen from FIGURE 1, tubes 13 leading to the pilots are straight and, therefore, if any of these tubes become plugged and inoperative for the supply of a gas to a pilot, they may be readily unplugged by simply drilling out the holes with a suitable size drill. This could be accomplished either while the gas distributor is in place in the apparatus or when the gas distributor is removed from the apparatus. The gas distributors of the prior art cannot be so easily maintained free of plugged pilots. In the apparatus shown in FIGURE 1, the gas distributor, other than hollow inner chamber 10, is generally formed of ceramic material such as alumina, silica, or mixtures of the two. The castable refractory ceramic materials are especially useful in forming the gas distributor. It is preferred to construct a gas distributor for use in the apparatus of the present invention such as is shown in FIGURE 2. Referring now to FIGURE 2, the end of gas distributor 4 adjacent the reaction chamber is formed of metal having fluid conducting conduits 15 therein adapted to receive a circulating cooling fluid. It can be seen this end having fluid conducting conduits therein is positioned between hollow inner chamber 10 of gas distributor 4 and reaction chamber 6 and, in the particular embodiment shown in FIGURE 2, is adjacent hollow inner chamber 10. The remaining solid portion of the gas distributor usually comprises ceramic material. In operation, water or other suitable cooling fluid enters fluid conducting conduits 15 through line 16, circulates in the conduits 15 surrounding parallel channels 5 and straight conduits 13, and exits via line 17.

Both FIGURES 1 and 2 show hollow chamber 10 extending substantially across the entire diameter of the gas distributor and such an arrangement is preferred. It is evident though that it would not be necessary for hollow chamber 10 to extend entirely across the gas distributor if pilots were needed only in the central portion of the gas distributor. Also, the apparatus illustrated in FIGURES 1 and 2 show end walls 11 and 12 of hollow inner chamber 10 to be flat and substantially perpendicular to the axis of parallel channels 5. This is a preferred method of constructing these end walls 11 and 12 of hollow inner chamber 10; however, they could be slightly concave or convex, or each end wall could be constructed differently from the other. Hollow inner chamber 10 of the apparatus of the present invention will generally be positioned and of such a size that it surrounds approximately ⅛ to ⅓ the length of the parallel channels, and the end wall 12 of the hollow inner chamber nearest the reaction chamber will be located from about ⅛ to about ⅜ the length of parallel channels 5 from the end of the gas distributor adjacent reaction chamber 6.

Side walls 8 of the reaction chamber may be constructed in various manners and of various materials. For example, side walls 8 may be constructed of ceramic material or of metal. Likewise, side walls 8 could be constructed of a porous material through which a fluid such as water is passed so that a film of water flows down the interior of the side walls 8 as described in U.S. Patent 3,234,300. Other means are also known in the art for providing a film of water on the interior of side walls 8 and may be used in the present invention. Side walls 8 may be constructed so that there are additional pilots therein to complement the action of the pilots on the end of the gas distributor. Side walls 8 may also be constructed so as to allow the injection of a hydrocarbon or water into reaction chamber 6 prior to being quenched by means of quench nozzle 9. In a preferred embodiment, side walls 8 are constructed of metal and have fluid conducting conduits therein adapted to receive a circulating cooling fluid such as water. "Side walls" as used herein refers to the internal surface of the reaction chamber, whether it be a continuous circular surface or whether it be made up of several surfaces coming together at various angles.

Generally, the straight conduits of the present invention leading from the hollow inner chamber of the gas distributor to the pilots on the end of the gas distributor will have a smaller cross-sectional area than the parallel channels leading from the mixing chamber to the reaction chamber. Although it is not necessary, it is preferable that the axes of the straight conduits leading to the pilots be parallel to the axes of the parallel channels leading from the mixing chamber to the reaction chamber. The straight conduits leading to the pilots may have various shapes such as eliptical or square and may have a non-uniform cross-section along the axis of the straight conduit. For example, these straight conduits could have a circular cross-section which is wider at the top of the straight conduit than at the bottom. Preferably, these straight conduits are of uniform circular cross-section and have a diameter ranging from ¹⁄₃₂ to ¼ inch.

The preferred hydrocarbons which may be subjected to incomplete combustion in the apparatus of the present invention will ordinarily be a paraffinic hydrocarbon with less than 7 carbon atoms such as methane, ethane, propane, isobutane, the hexanes, and the heptanes, methane being especially preferred. Natural gas, comprising essentially methane, is generally used as a hydrocarbon feed for the apparatus of the present invention. The oxygen-containing stream which is mixed with the hydrocarbon stream is preferably oxygen; however, any oxygen-containing stream such as air or oxygen enriched air can be used.

Preheating of the hydrocarbon feed gas and the oxygen feed gas to between 500° C. and 600° C. is preferred for best results but the apparatus of this invention is useful when the feed gases are preheated from about 400° C. and lower to as high as 800° C. and higher.

In using the apparatus of the present invention to manufacture acetylenes, the combustion of the gas mixture generally must develop temperatures in the range of about 1200° C. to about 1800° C., although it is possible to carry out the combustion and the conversion reactions at temperatures higher than 1800° C. and lower than 1200° C. The pressure is not particularly critical in the production of hydrocarbons such as acetylene and the apparatus of the present invention will generally operate at essentially atmospheric pressure but will also operate satisfactorily at pressures of 40 p.s.i.a. and higher and as low as 5 p.s.i.a. and lower.

What is claimed is:

1. An apparatus for the incomplete combustion of hydrocarbons with oxygen in a flame reaction comprising a mixing chamber and a reaction chamber, said mixing chamber having an entrance for the entry of oxygen and hydrocarbons thereto, a cylindrical gas distributor interconnecting said mixing chamber and said reaction chamber, said gas distributor having a plurality of parallel channels of uniform circular cross-section extending therethrough from said mixing chamber to said reaction chamber, said parallel channels containing devices for imparting a swirling motion to the gases exiting therefrom located between the midpoint of said channels and said reaction chamber, the end of said gas distributor adjacent the reaction chamber being formed of metal and the remaining solid portion being formed of ceramic material, said metal end of said gas distributor being provided with conduits for containing cooling water surrounding said parallel channels extending from said mixing chamber to said reaction chamber, said metal end of said gas distributor also having a hollow inner chamber which extends across the entire diameter of said gas distributor surrounding substantially all of said parallel channels provided with means for the supply of oxygen thereto and vertically-disposed, horizontally-spaced conduits connecting said hollow chamber with said reaction chamber for the passage of oxygen thereto.

2. The apparatus of claim 1 wherein said vertically-disposed, horizontally-spaced conduits are of uniform circular cross-section and have a diameter from 1/32 to 1/4 inch.

3. The apparatus of claim 1 wherein the end walls of said inner hollow chamber are substantially perpendicular to the axes of said parallel channels.

4. The apparatus of claim 1 wherein the axes of said vertically-disposed, horizontally-spaced conduits are parallel to the axes of said parallel channels.

5. An apparatus for the incomplete combustion of hydrocarbons with oxygen in a flame reaction comprising a mixing chamber and a reaction chamber, said mixing chamber having an entrance for the entry of oxygen and hydrocarbons thereto, a cylindrical gas distributor interconnecting said mixing chamber and said reaction chamber, said gas distributor comprising a block of ceramic material having a plurality of parallel channels of uniform circular cross-section extending therethrough from said mixing chamber to said reaction chamber, said parallel channels containing devices for imparting a swirling motion to the gases exiting therefrom located between the midpoint of said channels and said reaction chamber, said gas distributor having a hollow inner chamber defined by metal walls which extends across the entire diameter of said gas distributor surrounding substantially all of said parallel channels, said hollow inner chamber having a means for the supply of oxygen thereto and being in open communication with said reaction chamber by means of a plurality of vertically-disposed, horizontally-spaced conduits.

6. The apparatus of claim 5 wherein said vertically-disposed, horizontally-spaced conduits are of uniform circular cross-section and have a diamete from 1/32 to 1/4 inch.

7. The apparatus of claim 5 wherein the end walls of said inner hollow chamber are substantially perpendicular to the axes of said parallel channels.

8. The apparatus of claim 5 wherein the axes of said vertically-disposed, horizontally-spaced conduits are parallel to the axes of said parallel channels.

References Cited

UNITED STATES PATENTS

| | | | |
|---|---|---|---|
| 2,998,464 | 8/1961 | Burleson et al. | 260—679 |
| 3,000,989 | 9/1961 | Larcher et al. | 260—679 |
| 3,121,616 | 2/1964 | Braconier et al. | 23—277 |
| 3,178,488 | 4/1965 | Akin | 260—679 |
| 3,213,015 | 10/1965 | Atkinson et al. | 196—116 X |
| 3,234,300 | 2/1966 | Howard | 260—679 |
| 3,246,957 | 4/1966 | Faucer | 23—277 |
| 2,576,228 | 11/1951 | Kinnaird | 23—277 |
| 3,047,371 | 7/1962 | Krause et al. | 23—277 |
| 3,087,797 | 4/1963 | Bogart | 23—277 |
| 3,353,915 | 11/1967 | Latham et al. | 23—277 X |
| 1,714,473 | 5/1929 | Hepburn | 431—353 X |
| 2,839,128 | 6/1958 | Schweitzer et al. | 431—353 X |

FOREIGN PATENTS

| | | |
|---|---|---|
| 1,071,075 | 12/1959 | Germany. |
| 889,259 | 2/1962 | Great Britian. |

OTHER REFERENCES

International Chemical Engineering, October 1964, pages 612–617.

NORMAN YUDKOFF, *Primary Examiner.*

F. E. DRUMMOND, *Assistant Examiner.*

U.S. Cl. X.R.

260—679; 196—116